United States Patent [19]

Johnson

[11] Patent Number: 5,428,282
[45] Date of Patent: Jun. 27, 1995

[54] RELEASE-TYPE PERMANENT MAGNET MOTOR
[75] Inventor: William H. Johnson, Colchester, Vt.
[73] Assignee: Fluidmaster, Inc., Anaheim, Calif.
[21] Appl. No.: 1,803
[22] Filed: Jan. 8, 1993
[51] Int. Cl.⁶ ............................................. H02K 21/14
[52] U.S. Cl. ..................................... 318/701; 318/704; 318/254; 318/685
[58] Field of Search ............... 318/704, 696, 685, 439, 318/254, 139, 138, 701

[56] References Cited
U.S. PATENT DOCUMENTS

| 2,900,589 | 8/1959 | Putnocky, Jr. | |
|---|---|---|---|
| 2,922,943 | 1/1960 | Rupp | 318/254 |
| 3,229,179 | 1/1966 | Hetzel | |
| 3,313,993 | 4/1967 | Rupp | 318/254 |
| 3,344,325 | 9/1967 | Sklaroff | 318/138 |
| 3,356,920 | 12/1967 | Button | 318/138 |
| 3,445,741 | 5/1969 | Gerber | 318/138 |
| 4,235,153 | 11/1980 | Rinde et al. | 310/14 X |
| 4,510,422 | 4/1985 | Ogura | 318/254 |
| 4,528,486 | 7/1985 | Flaig et al. | 318/254 |
| 4,654,566 | 3/1987 | Erdman | |
| 4,766,387 | 8/1988 | Browne et al. | 318/490 X |

FOREIGN PATENT DOCUMENTS 2367374 10/1976 France.

Primary Examiner—Bentsu Ro
Attorney, Agent, or Firm—Freilich Hornbaker Rosen

[57] ABSTRACT

Improvements are described in an electric motor that includes a rotor with permanent magnets and a stator with electromagnets, of the "release" type wherein current to a "last" electromagnet that a permanent magnet is moving away from, receives only enough current to "release" the permanent magnet from the electromagnet core, with the permanent magnet attracted to the core of the "next" electromagnet whose coil does not carry current. The amount of current to the "last" electromagnet varies with the angular distance of the permanent magnet moving away from the "last" electromagnet. The electromagnets and permanent magnets can be in a ratio of 3 to 2. The percent of total electromagnets which are energized during each complete rotation of the rotor, can be reduced to save electricity when only a small output torque is required.

6 Claims, 4 Drawing Sheets

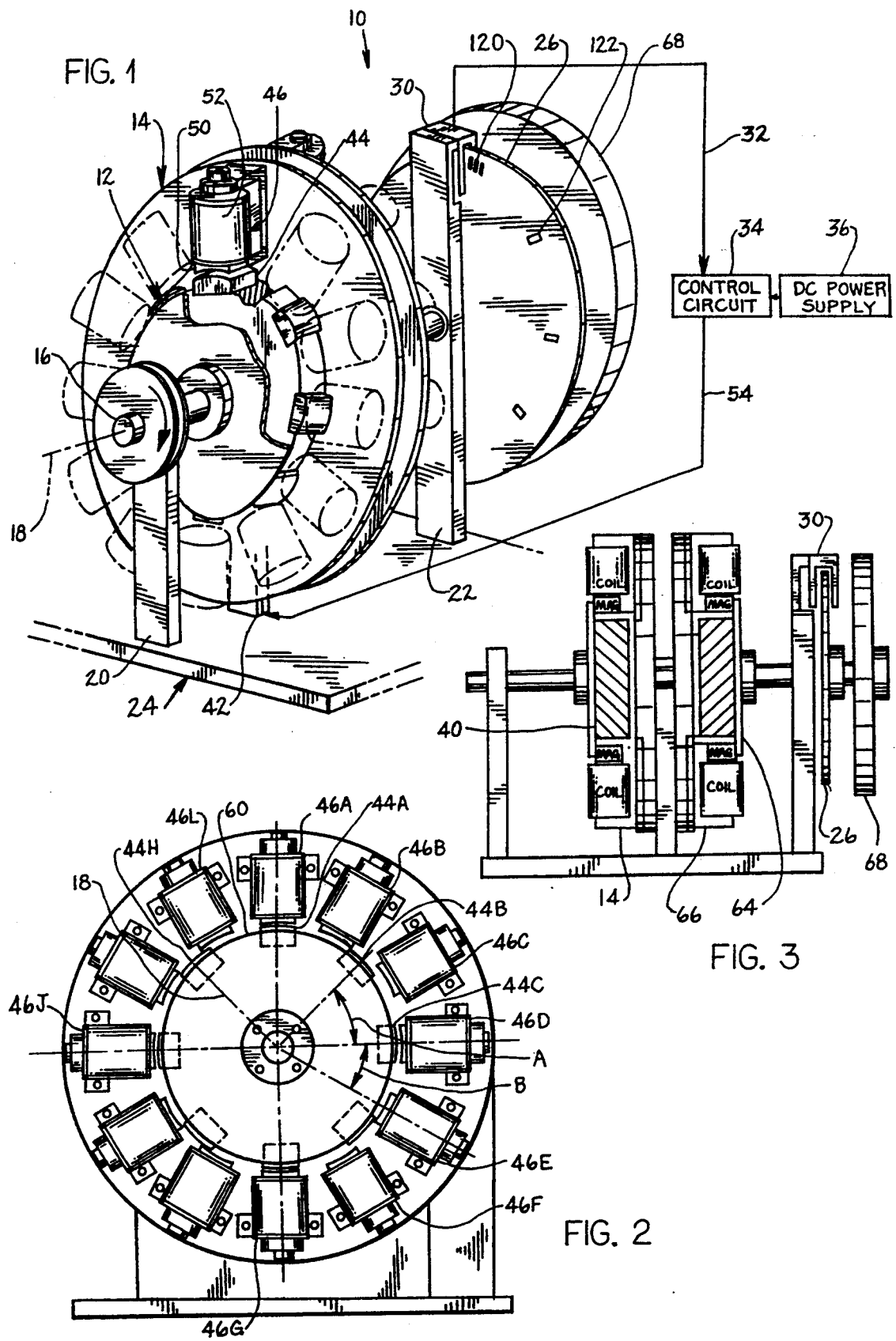

RELEASE-TYPE PERMANENT MAGNET MOTOR

BACKGROUND OF THE INVENTION

Permanent magnet motors where permanent magnets are spaced about the rotor and interact with electromagnets spaced about the stator, provide efficient motors for energization from direct current sources such as batteries. In most prior art permanent magnet motors, the electromagnets are energized at high current levels to attract and/or repel the permanent magnets to produce a mechanical power output. In another type of permanent magnet motor which may be referred to as the "release" or "nullify" type, the coil of a "last" electromagnet is energized only to release a permanent magnet so the permanent magnet can be attracted to the core of the "next" electromagnet. French patent 2,367,374 by Langevin describes a motor that uses current solely to nullify the attraction of a permanent magnet for a "last" electromagnet.

SUMMARY OF THE INVENTION

In accordance with one embodiment of the present invention, improvements are provided in release-type permanent magnet motors which increase their efficiency. The current applied to a "last" electromagnet (that an adjacent permanent magnet is moving away from) is preferably adjusted so the current varies to maintain a largely zero net force between the core of the electromagnet and the permanent magnet moving away from it. A control deactivates selected groups of electromagnets during multiple rotor turns, to save electricity when only low output torque is required. The electromagnets can be arranged in groups of three for every two permanent magnets.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial isometric view of a motor constructed in accordance with the present invention.

FIG. 2 is a front elevation view of the motor of FIG. 1.

FIG. 3 is a partially sectional side view of the motor of FIG. 2.

DESCRIPTION OF THE PREFERRED EMBODIMENTS

Figure 4:
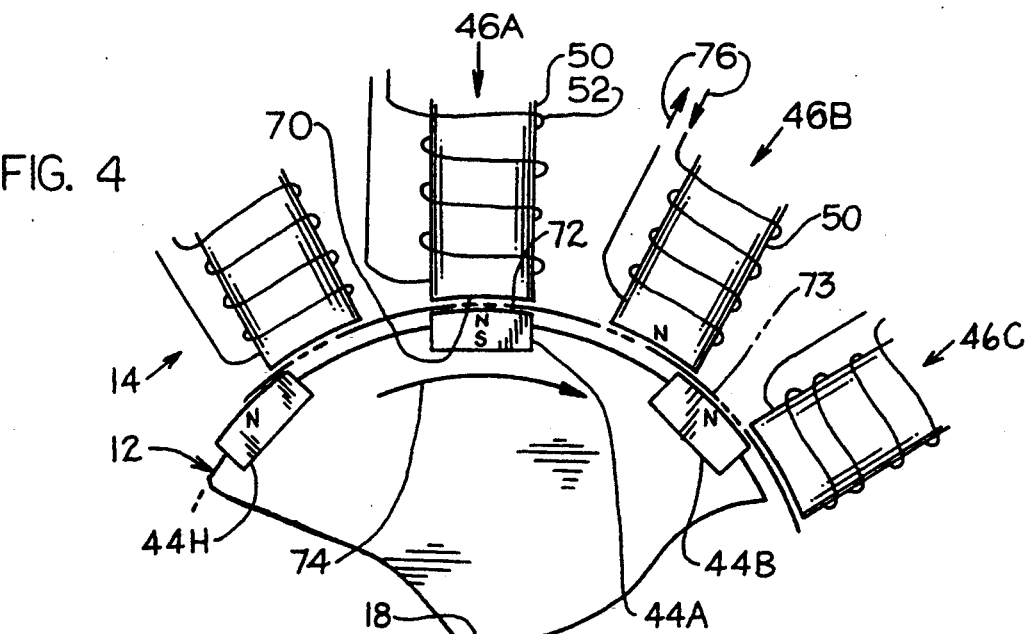
FIG. 4 is a simplified partial view of the motor of FIG. 2, with a first permanent magnet in a center alignment position.

FIG. 1 illustrates an electric motor 10 which includes a rotor assembly or rotor 12 and a stator assembly or stator 14. The rotor has a shaft 16 that is rotatable about an axis of rotation 18 on bearings mounted on supports 20, 22 of a support assembly 24. An index wheel 26 is fixed to the rotor shaft and passes across an index sensor 30 which senses the rotational position of the rotor. The output of the index sensor is delivered over a sensor line 32 to a control circuit 34. The control circuit is connected to a DC power supply 36 such as a group of batteries. The control circuit controls the delivery of current from the power supply to the stator of the rotor, to energize the motor so as to rotate it.

The rotor includes a rotor body 40 and a group of permanent magnets 44 spaced about the periphery of the rotor and its body. The stator 14 includes a group of electromagnets 46 that interact with the permanent magnets on the rotor. Each electromagnet includes a core 50 of ferromagnetic material such as silicon steel and a winding 52 that is connected through wires of a cable 54 to the control circuit. The control circuit energizes selected electromagnets (the windings thereof) in a manner to be described below, which causes rotation of the rotor so it can produce a considerable mechanical output.

As shown in FIG. 2, the particular motor has eight PMs (permanent magnets) 44A–44H which are uniformly spaced about the rotor axis 18 along the periphery 60 of the rotor (of its rotor body). Thus, the PMs are spaced apart by an angle A of 45°. The motor has twelve EMs or electromagnets 46A–46L that are also uniformly spaced about the axis 18 so they are spaced apart by an angle B of 30°. As shown in FIG. 3, the particular motor includes two rotors 40, 64 and two corresponding stators 14, 66, and also includes a flywheel 68.

Figure 5:
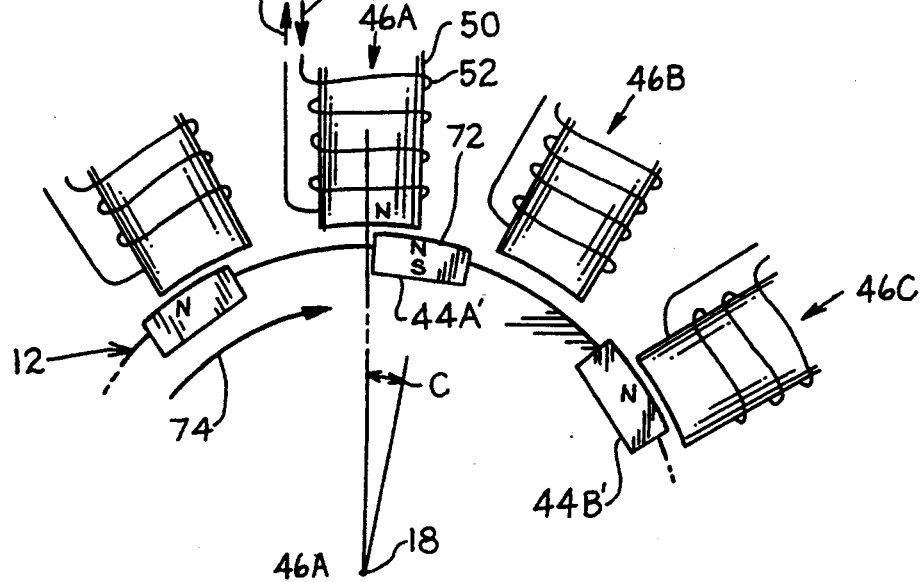
FIG. 5 is a view similar to that of FIG. 4, but with the rotor turned 10° clockwise.
Figure 6:
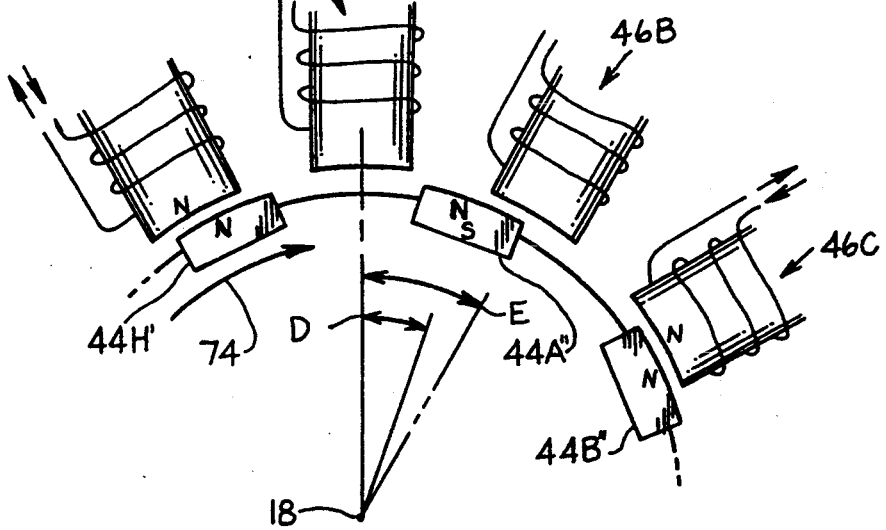
FIG. 6 is a view similar to that of FIG. 4, but with the rotor turned 20° clockwise.

Reference is made to FIGS. 4–6 which indicate the manner in which the motor is energized. With the relative positions of the rotor and stator 12, 14 as shown in FIG. 4, it can be seen that a first PM 44A is in a center alignment position with the core 50 of the electromagnet 46A. The core 50 has a face 70 lying close to the path of the faces 72 of the PMs with only a small air gap between them at an imaginary interface circle 73. At the orientation of FIG. 4, the first electromagnet 46A (the winding 52 thereof) does not carry any current, as such current does not help rotation. A second PM 44B lies half-way between the second and third electromagnets 46B and 46C. If no current flowed through either electromagnet 46B or 46C, then the permanent magnet 44B would be equally attracted to the cores of both electromagnets and there would be no net torque tending to rotate the rotor in the direction of arrow 74. Applicant flows a current, indicated by arrows 76, through the windings of the second electromagnet 46B to magnetize the core 50 of that electromagnet to "release" the second PM 44B and allow it to move away from the core of the electromagnet 46B.

The amount of current 76 passed through the second electromagnet 46B is only that which is required to create a substantially zero force between the second PM 44B and second electromagnet 46B. With substantially no force dragging the second PM 44B backward (opposite to arrow 74) the main force on the second PM 44B is towards the core of the third electromagnet 46C. The third electromagnet 46C is not energized (no current flows through its windings) so the only force between the PM 44B and electromagnet 46C is the magnetic attraction of the PM 44B for the "soft iron" core of the third electromagnet 46C. Thus, the forces tending to rotate the rotor in the direction of arrow 74 are the forces of attraction of PMs such as 44B for the cores of substantially unenergized electromagnets such as that of electromagnet 46C which the magnet 44B is approaching. Except when high loads are applied, as when an electric car must rapidly accelerate or must move at high speed, most (over 50 per cent), and preferably almost all (over 75 per cent) torque rotating the rotor arises from the attraction of some PMs towards the cores of substantially unenergized electromagnets that the PMs are approaching. Generally, substantially all of the current supplied to the motor at moderate loads is used to negate the backward force on those PMs that are moving away from the core of a "last" electromagnet that the PM was just previously aligned with. It is noted that French patent 2,367,374 by Langevin describes applying an electromagnetic coil current just to nullify backward attraction.

FIG. 5 illustrates the motor of FIG. 4, after the rotor 12 has rotated by an angle C of 10°. As a result, the first PM is at the position 44A' wherein it is moving away from the first electromagnet 46A and toward the second electromagnet 46B. The first electromagnet 46A can therefore be considered to be the "last" electromagnet (the last one that the PM was aligned with) and the second electromagnet 46B can be considered to be the "next" electromagnet (the one that the PM will next be in alignment with). At this time, the first electromagnet 46A will be energized as indicated by arrows 76 to make its face 70 have a north magnetic pole of relatively low intensity. The low north pole magnetic flux density produced at the face 70 of electromagnet 46A, by current flow, is sufficient to substantially cancel the attraction between the north pole face at 72 of the first PM at 44A', and the core 50 of the first electromagnet. This avoids a backward force on the PM 44A', so its attraction for the core of the second electromagnet 46B can be used to turn the rotor.

FIG. 6 illustrates the motor after the rotor has turned by an angle D of 20° from the position of FIG. 4, so that the first PM has moved to the position 44A''. Since the first PM at 44A'' is still moving away from the first electromagnet 46A, a current can continue to be applied to the first electromagnet to negate the backward pull on the first PM 44A''. However, if there is any current through the first electromagnet, it should be small, to avoid substantial repulsion of the PM at 44H'' which is approaching the first electromagnet 46A. It also can be seen that the second PM 44B'' has moved past a position of alignment with the third electromagnet 46C (which it attained after 15° of rotor rotation from the position of FIG. 4). As a result, the third electromagnet 46C is the "last" electromagnet for the PM at 44B'', and such last electromagnet 46C is energized to negate the backward attraction of the second PM 44B''. In the manner described above, each "last" electromagnet is energized to negate attraction for the PM moving away from it (at least until the approaching permanent magnet comes close), while the "next" electromagnet which the PM is approaching, is substantially unenergized and torque is provided by attraction of the PM for the core of the unenergized next electromagnet. The angle E of 30° is the angle to which the first PM 44A'' must be turned to be at a center alignment position with second electromagnet 46B.

In a simpler notation, it is possible to identify the three electromagnets 46A–46C as "EMA, EMB, and EMC", and to identify the permanent magnets 44A and 44B as "PM1 and PM2".

Figure 7:
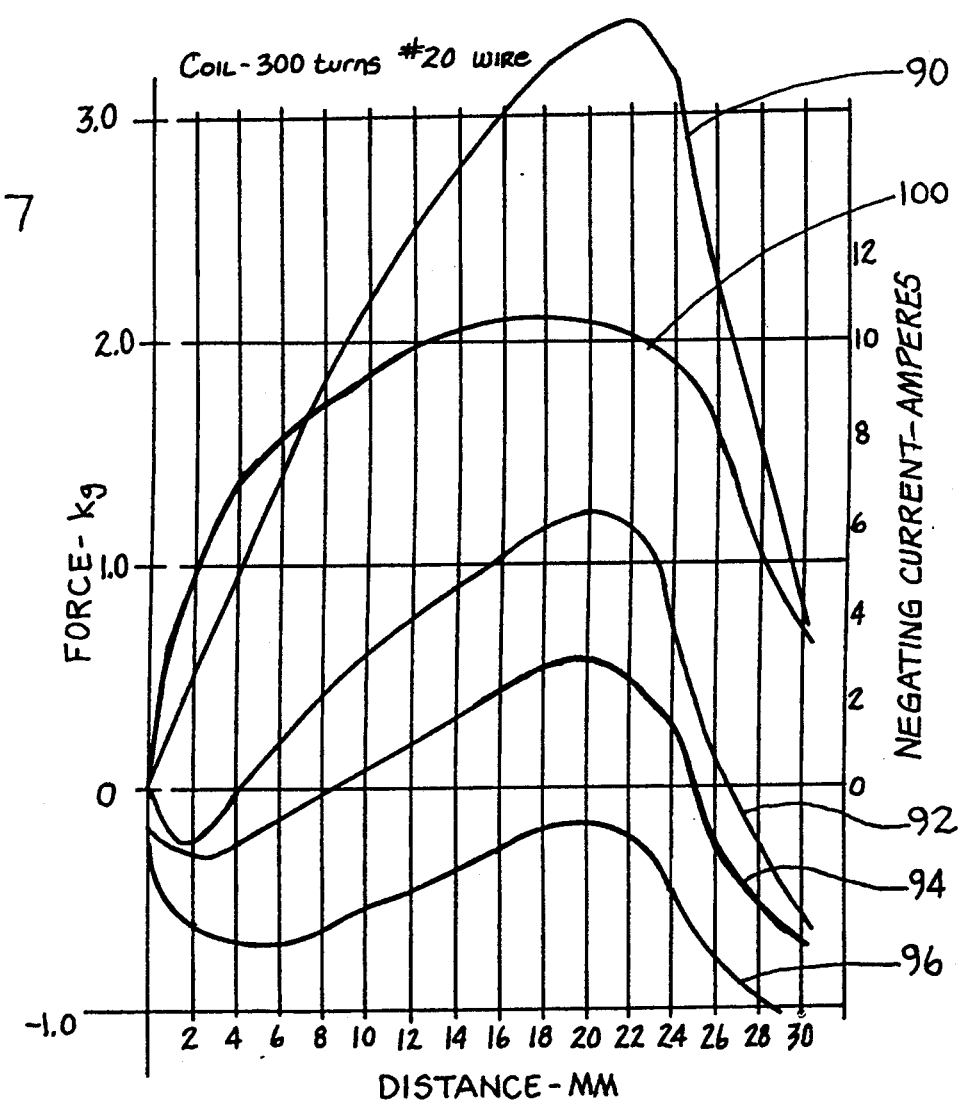
FIG. 7 is a graph showing force versus displacement when a single magnet is moved linearly with respect to a single electromagnet, and indicating the variation in current required to produce a zero force.

FIG. 7 illustrates the results of an experiment wherein a single permanent magnet was moved in a line away from a single electromagnet, this occurring several times, with a different constant current applied to the electromagnet each time. The current was in a direction to magnetize the core of the electromagnet to repel the permanent magnet. The variation in force of the permanent magnet with distance from its center alignment position with the electromagnet, was measured. The permanent magnet had a face area of one inch by one inch and was constructed of neodymium—boron—iron. The electromagnet had a corresponding face, and included 300 turns of wire. A first curve 90 shows the variation in force in kilograms on the vertical scale versus the displacement in millimeters on the horizontal scale, when the current was zero. The greatest force occurred at a displacement of 22 mm which is about 85 per cent of the width of the facing poles. A second curve 92 shows a situation when a constant current of seven amperes was passed through the winding of the electromagnet, the curve showing that this resulted in zero force at displacements of about 4.1 and 26.3 mm. Curve 94 shows a situation when nine amperes and curve 96 shows a situation when eleven amperes, was passed through the coil. From these curves 90–96, applicant has constructed the curve 100 which shows approximately the amount of negating current that should pass through the electromagnet so there is substantially zero force between the permanent magnet and the electromagnet as the permanent magnet moves away from a position of alignment.

Figure 8:
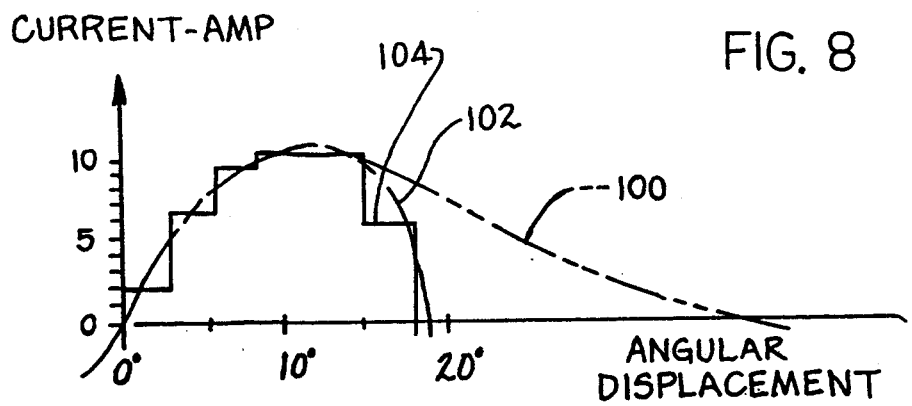
FIG. 8 is a graph showing variation in current with rotor rotation for the motor of FIG. 1 in order to produce substantially zero force between a permanent magnet and a last electromagnet.

FIG. 8 includes a curve 100 representing the variation in current to an electromagnet, with displacement of a permanent magnet therefrom, to achieve substantially zero force between them, as the permanent magnet rotates on a rotor. However, in a real motor such as the one of FIGS. 1–6, as one permanent magnet moves away from an electromagnet, another permanent magnet moves closer thereto. At a rotation angle at 22.5°, the two permanent magnets (44A and 44H) are equally spaced from the core of the electromagnet (46A). Curve 102 represents a better variation of current with angular rotation of the rotor (where 0° is where a permanent magnet is aligned with the electromagnet to be soon energized). It can be seen that the current falls rapidly at an angular rotation of more than about 15°, in order to avoid repulsion of the permanent magnet that is approaching the electromagnet. The current is greatest at about 12° of rotation (40 per cent of rotation from alignment with a first core, to alignment with a second core) and much less at half of that, or 6°. The current at about 20° (67 per cent of rotation from alignment with a first core to alignment with a second or "next" core) is shown as being zero, which is less than half the current at 12° of rotation. Although it is possible to provide an analog variation of voltage with angular rotation, to each electromagnet, the circuitry would be expensive and result in considerable losses. The graph 104 represents an approximation to the curve 102, achieved by changing the voltage in steps, at angles of rotation of 3° each, to approximately follow the analog curve 102. It can be seen that the current level at 9° (which is 30 per cent of the total angle E of 30° between positions of alignment of the magnet with two adjacent electromagnets) is greater than the current level at 3° (which is ten per cent of the total angle). Also, the current is greater at 12.25° (half or 50° of the angle between where one magnet is aligned with an electromagnet core and where the two permanent magnets are equally spaced from the core) than at an angle of one-half as much or about 6° (one-quarter or 25 per cent of the angle).

The winding of each electromagnet acts as an inductor that resists a change in current passing through it. If the inductance is high, then it can be difficult to vary the current in the manner indicated by graph 104. Tests by applicant on the coils constructed by him, indicate that the time constants of the coils are small enough that the current can be readily changed in several steps during each about 20° of turning, during rotation of the rotor at a relatively high speed such as ten revolutions per second. The time amplitude, and duration of voltage pulse application relative to the position of the rotor, can be varied as the speed of rotor rotation varies.

Figure 9:
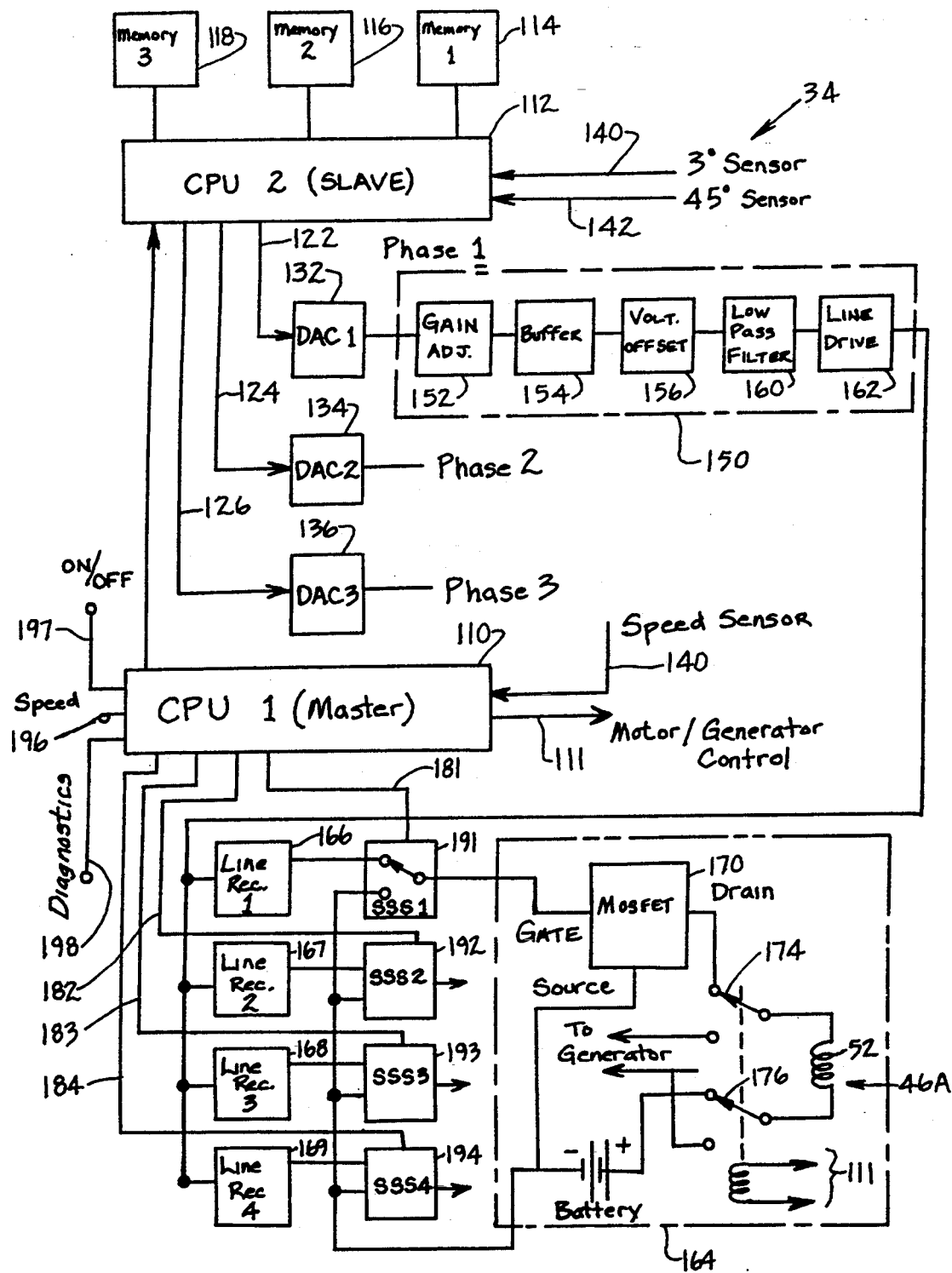
FIG. 9 is a primarily block diagram of the control circuit of the motor of FIG. 1.

FIG. 9 illustrates details of the control circuit which can control the motor of FIGS. 1-6. The circuits include two programmed CPU's (central processor units), CPU1 numbered 110 and CPU2 numbered 112. CPU1 is used as a master control and CPU2 as a slave. Motor on/off and speed control are functions of CPU1 and the phasing of electromagnets is the main function of CPU2.

Three memory segments 114-118 are attached to CPU2. Each memory segment 114-118 stores a "look up" table representing the current to be applied to a particular coil during rotation of the rotor. Referring to FIG. 2, it can be seen that the coils operate in four groups, called phase units, each of which includes three coils, with the first group including coils of electromagnets 46A, 46B and 46C. At any given time, the current applied to the first electromagnet 46A of the first group of three, is the same as the current applied to the first electromagnet 46D of a second group of three electromagnets 46D, 46E and 46F (and the first electromagnets 46G, 46J of the other groups). Thus only three memories or "look up" tables are required, one for each of the three coils in each phase unit.

Referring to FIG. 9, memory 114 is a look up table listing the current or voltage to be applied to the first coil of each phase unit, during each 3° of rotor rotation. 3° was chosen because the index wheel (26 of FIG. 1) has markings 120 (in the form of slots or reflectors) spaced 3° apart around the axis of rotation. It may be noted that the index wheel has markings 122 indicating every 45° of rotor rotation. After each 3° of rotor rotation, the three memories 114-118 deliver a new signal indicating the new level of current to a corresponding one of the three coils or electromagnets in a phase unit. The detector (30 of FIG. 1) is of special design. The output of a central infrared emitter is reflected back into one of two infrared detectors depending on whether a 3° or a 45° slot (reflector) is in line with a narrow slit on the side of the detector unit 30 facing the index wheel.

The slave CPU2 112 has three outputs 122-126 that each represents the current to be delivered to one of the three coils in a phase unit (there are four phase units). Each output is connected to a corresponding one of three DAC (digital analog converters) 132-136. The inputs to the slave CPU2 112 includes a first input 140 which carries a pulse after every 3° of rotor rotation, which is obtained from one of the index sensors of detector 30 of FIG. 1. Another input 142 is a pulse that is delivered after every 45° of rotor rotation, which results in the resetting of circuits in the slave CPU2 112. Input 140 is also used as a speed detector for load-speed control by CPU1. The output of each DAC such as 132 is an analog signal which is delivered to a circuit portion 150 that operates as a set of operational amplifier components (designed to be supplied with plus and minus 15 volts) as such components are inexpensive and readily available.

The first part 152 of the subcircuit 150 is a gain adjuster 152 whose output is delivered to a buffer 154 which rejects extraneous signals. The output of the buffer is delivered to a voltage offset circuit 156 which offsets the input voltage to take account of the fact that the MOSFETS to be used for coil current control later in the circuit require a threshold offset of approximately 3.1 volts. The output of offset circuit 156 is delivered to a low pass filter 160 which rejects high frequency noise and whose output is delivered to a line driver or operational amplifier 162. The output of the line driver 162 is delivered to one of several line receivers 166-169. A second circuit portion 164 operates at plus 24 volts to be consistent with the output of two series connected 12 volt lead storage batteries. The output of the line receiver 166 is delivered to a solid state switch SSS1 191 which controls the input to an operational amplifier consisting of two parallel MOSFETs 170. The level of input voltage at the gate of the MOSFETs controls the current applied to the electromagnet coil 52 of electromagnet 6A. The outputs of the other line drivers 167-169 pass through solid state switches 192-194 and through circuits similar to portion 164, to energize the coils 52 of electromagnets 46D, 46G, and 46J, respectively.

The motor can be operated in a generator mode where the electromagnets are disconnected from the driving MOSFETs and connected to battery charging units. This is accomplished by means of the relay contacts 174 and 176. These are shown in the motor drive configuration, which would be the normally on configuration. Activation of the relays by signals 111 from the master CPU1 110, disconnects the driver circuits and connects the recharging circuits.

Each of the electromagnet coils 52 of the motor has a dual control. When the solid state relay SSS1 191 connects the line receiver 166 to the MOSFETs 170, current through the coils is under control of the slave CPU2 112. When SSS1 191 is in its alternate position, the gates of the MOSFETs are brought to the same voltage as the source, thus shutting off the MOSFETs. As mentioned above, switches 191-194 control the delivery of current to the coils of the first electromagnets 46A, 46D, 46G and 46J of the four groups of three electromagnets each. The second and third coils of each phase group are controlled by similar solid state switches. At any one time, an entire phase group (of three coils) can be turned on or off. The master CPU1 110 has outputs (four of them shown as 181-184 in FIG. 9) which control the solid state switches. This allows the master CPU1 to stop the flow of current through any of the four coils 52 of the four electromagnets 46A, 46D, 46G or 46J during the time when current is flowing through the other of the four coils. The same applies to the second and third coils of a given phase group. Thus, during an entire rotor turn, a coil can be "taken out" along with the other coils in its phase unit when the motor is under low load conditions or one of the coils is found defective by diagnostic circuits 198. This provides for an ongoing "diagnostic" control of electromagnet behavior, thus preventing "lock up" conditions when one phase group has an excessive "back torque" due to coil failure.

The master CPU1 110 can be adjusted for constant speed at various loads by detecting changes in speed via the 3° sensor 140. Speed can also be controlled manually through input 196 to CPU1. The motor is turned on and off through input 197. The direction of rotor rotation can be reversed by switching the phases, so in FIG. 4 only electromagnet 46C is energized to negate, at the position of FIG. 6 only electromagnet 46B is energized, etc.

As discussed above, applicant prefers to use permanent magnets of Nd—B—Fe (neodymium—boron—iron), which have only recently (about 1986) been available. Such permanent magnets have such high induction (so the grains are stiffly held) that they do not demagnetize themselves even when they have a small thickness between their opposite ends that have different magnetic polarities.

It is noted that the motor does not have a "closed magnetic loop" arrangement, in that there is no short soft iron path for the return of the magnet field lines that pass between adjacent poles of a permanent magnet and of an adjacent electromagnet core.

Thus, the invention provides a motor of the type that has permanent magnets, which operates with high efficiency. The motor is of the type that is generally operated by energizing each of the electromagnets only to "release" a permanent magnet that is moving away from that electromagnet. The negating current can be changed or varied as a permanent magnet moves away from an electromagnet, so as to maintain a largely zero magnetic force between the permanent magnet and last electromagnet. At low power levels, the number of "units" (e.g. three electromagnets and two magnets) operating can be reduced to obtain higher efficiency. The computer that drives the motor, can sense the operation of any unit (e.g. which includes three electromagnets) to determine whether or not the electromagnets are operating properly. For example, if the ratio of voltage to current passing through the winding of an electromagnet is above or below predetermined ratios, this may indicate that there is an open circuit or short circuit in that electromagnet. The computer can then "take out" a defective electromagnet by not passing a negating current through it. Although the permanent magnets may be located on the rotor member and the electromagnets on the stator member, it is possible to instead mount the permanent magnets on the stator member and the electromagnets on the rotor member, which is the equivalent.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electric motor of the type that includes rotor and stator members, with a first of said members having a plurality of permanent magnets spaced about the axis of rotor rotation, a second of said members having a plurality of spaced electromagnets each having a core of magnetic material and a coil, and a control circuit coupled to said electromagnets to energize each of them to at least release an adjacent permanent magnet relatively moving away from the electromagnet core, wherein:

said control circuit is constructed to include a lookup table means which increases the current applied to a last electromagnet as a previously adjacent permanent magnet moves away from said last electromagnet toward a next electromagnet, so the current applied after said permanent magnet moves 30 per cent of the distance toward alignment with a next electromagnet core is greater than after said permanent magnet has moved 15 per cent of the distance toward alignment with said next electromagnet core.

2. An electric motor of the type which includes rotor and stator members wherein a first of said members has a plurality of permanent magnets and a second of said members has a plurality of electromagnets that each comprises a core of ferromagnetic material and a coil, with each permanent magnet and each core having a face lying on an imaginary interface circle, wherein the motor also includes a control circuit which is responsive to the rotation angle of said rotor to control energization of at least a first of said electromagnets, and wherein;

said control circuit is constructed to energize said first electromagnet with a release current primarily during a release time period when the face of a first permanent magnet that was most recently aligned with the electromagnet core face of said first electromagnet is relatively moving away therefrom, and until an in between rotor position when the face of a second permanent magnet that is approaching said first electromagnet lies as close thereto as said first permanent magnet, with the release current applied to said first electromagnet during said release time period being primarily in an amount to negate backward attraction of said first permanent magnet toward said core of said first electromagnet and less than an amount which primarily repels said first permanent magnet from said core of said first electromagnet, during operation of said motor at moderate load conditions;

said control circuit is constructed to vary the amount of release current applied to said first electromagnet so the release current is greater when said first permanent magnet lies at a second position which lies beyond alignment with said first electromagnet core face by 40 per cent of a predetermined angle between alignment with said first electromagnet core face and alignment with a next electromagnet core face, than when said first permanent magnet lies at a first position only 20 per cent of the said predetermined angle away from alignment with said first electromagnet core, and so the release current when said first permanent magnet lies at a third position which is 67 per cent of said predetermined angle beyond alignment with said first electromagnet core is less than half the release current at said second position.

3. The motor described in claim 2 wherein:
said control circuit is constructed to change which of said electromagnets are energized during a second complete rotation of said rotor as compared to the electromagnets energized during a previous first complete rotation of said rotor.

4. The motor described in claim 2 wherein:

said permanent magnets and electromagnets have poles opposite said interface circle, which are devoid of close magnetic coupling respectively to a corresponding permanent magnet and to a corresponding electromagnet core.

5. A method for controlling energization of the electromagnets of a motor during moderate load conditions, wherein the motor has a stator assembly and a rotor assembly, wherein a group of permanent magnets are mounted on a first of said assemblies and spaced in a circle thereon and a group of electromagnets are mounted on a second of said assemblies and spaced in a circle thereon, wherein each electromagnet has a core of magnetically attractive material and an energizable coil, and wherein the relative movement of each permanent magnet relative to said electromagnets causes the permanent magnet to move 100 per cent of the alignment angle between positions of center alignment with a last and next electromagnet core, comprising:

energizing each of a plurality of said electromagnets during at least some of the time when the closest permanent magnet is moving away from the last adjacent electromagnet that said closest magnet lay adjacent and in alignment with, each said last adjacent electromagnet energized to substantially negate the magnetic attraction between said closest permanent magnet and the core of said last adjacent electromagnet, so most motor torque which is produced by all permanent magnets and electromagnets tending to rotate said rotor in a first direction in which said rotor is rotating, results from the level of magnetic attraction of each closest permanent magnet to the core of each next adjacent electromagnet that said closest permanent magnet is approaching that would exist in the absence of energization of said next adjacent electromagnet;

said step of energizing includes applying current to a last electromagnet which increases as the corresponding permanent magnet moves from a first position spaced twenty per cent of the alignment spacing angle away from alignment with the last electromagnet, and a second position spaced 40 per cent of the alignment spacing angle away from the last electromagnet, with the relationship between current and angular displacement being generally as given by graphs 102 and 104 of FIG. 8.

6. The method described in claim 5 including:

energizing only some of said electromagnets during a plurality of turns of said rotor, when the required output torque is low, and energizing all of said electromagnets during a plurality of turns of said rotor when the required output torque is higher.

* * * * *